United States Patent [19]
Schnelle

[11] Patent Number: 5,209,317
[45] Date of Patent: May 11, 1993

[54] ELECTRO-HYDRAULIC VEHICULAR POWER STEERING SYSTEM WITH CLOSED CENTER VALVING

[75] Inventor: Steven H. Schnelle, Van Wert, Ohio

[73] Assignee: United Technologies Automotive, Inc., Dearborn, Mich.

[21] Appl. No.: 781,654

[22] Filed: Aug. 17, 1990

Related U.S. Application Data

[63] Continuation of Ser. No. 279,601, Dec. 5, 1988, abandoned.

[51] Int. Cl.$^5$ .......................... B62D 5/06; B62D 5/08; B62D 5/083
[52] U.S. Cl. ...................... 180/132; 60/413; 180/149
[58] Field of Search ............. 180/132, 148, 149; 60/413

[56] References Cited

U.S. PATENT DOCUMENTS

| | | | |
|---|---|---|---|
| 3,083,533 | 4/1963 | Schenkelberger | 180/132 X |
| 3,976,158 | 8/1976 | Shaffer | 180/132 |
| 4,317,499 | 3/1982 | Miller | 180/133 |

FOREIGN PATENT DOCUMENTS

| | | | |
|---|---|---|---|
| 2361893 | 6/1975 | Fed. Rep. of Germany | 180/132 |
| WO88/01958 | 3/1988 | PCT Int'l Appl. | 180/132 |
| 2031826 | 4/1980 | United Kingdom | 180/132 |
| 2083424 | 3/1982 | United Kingdom | 180/149 |
| 2212463 | 7/1989 | United Kingdom | 180/149 |

*Primary Examiner*—Mitchell J. Hill

[57] ABSTRACT

An electro-hydraulic power steering system for motor vehicles using closed center valving. Utilizing closed center valving (40) in association with the steering gear (50) allows the pump (12) to build hydraulic pressure in the accumulator (20) against the closed center valve area (47) in the valving for the steering gear, thus always maintaining a relatively high pressure, regardless of the position of the steering wheel shaft 3 and the input shaft (43). The input shaft was modified from that of the prior art, particularly with respect to the size and relative positioning of the exterior grooves (140) for the return ports (46), which exterior grooves selectively mate with like, longitudinally extended grooves (144) in the conventional control sleeve (42).

2 Claims, 4 Drawing Sheets

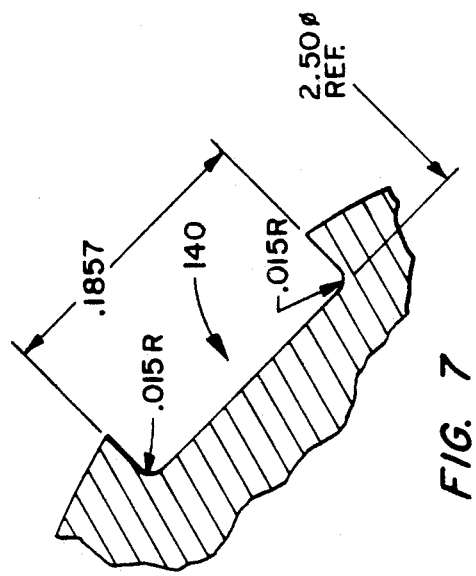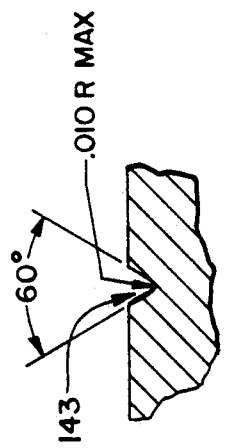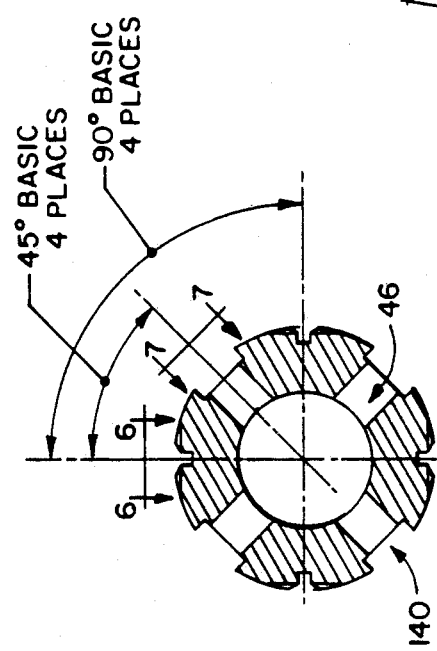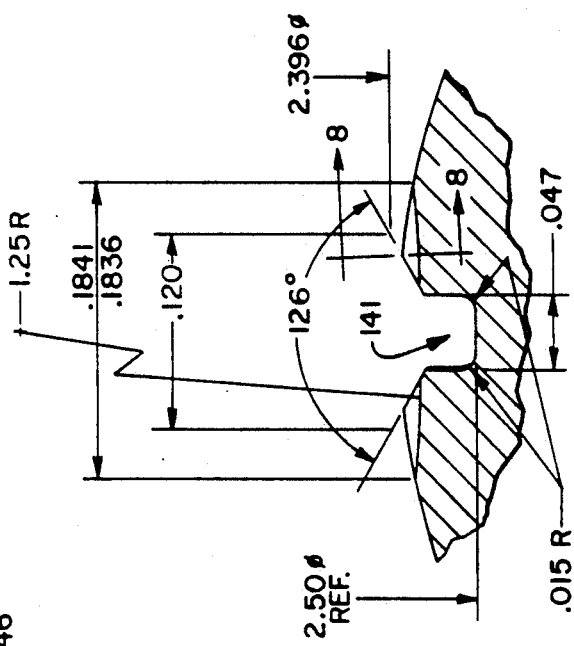

ELECTRO-HYDRAULIC VEHICULAR POWER STEERING SYSTEM WITH CLOSED CENTER VALVING

REFERENCE TO RELATED APPLICATION

This is a continuation of application Ser. No. 07/279,601 filed Dec. 5, 1988 entitled "Electro-Hydraulic Vehicular Power Steering System With Closed Center Valving", abandoned in favor of this application.

TECHNICAL FIELD

The present invention relates to electro-hydraulic power steering systems for vehicles, such as, for example, automobiles, and more particularly to such a system which has closed center valving, as opposed to an open center configuration.

BACKGROUND ART

The common, prior art approach to providing steering assist is to utilize a belt driven auxiliary pump, which runs continuously, coupled to an open center valve gear. This long standing system is highly inefficient, in that it is sized to do its work at parking maneuvers, and therefore produces significant energy losses when at highway speeds.

To alleviate this problem an "on demand" prior art approach for an electro-hydraulic, vehicular power steering system was developed, which included an electric motor driven, hydraulic pump, which charged an accumulator against an electronic metering valve. A pressure switch maintained a set pressure range in the accumulator.

The electronic metering valve, which was controlled by a microprocessor, metered the flow of high pressure hydraulic fluid to a standard steering gear from the accumulator. The microprocessor determined the amount of assist required, using inputs of road speed, steering wheel velocity and acceleration.

Such systems have functioned, but typically, not well. Prior attempts to improve the performance of such systems have helped, but only slightly.

An analysis of the prior system by applicant revealed the major problem with the system. The majority of the accumulator charge was being lost back to the reservoir through the standard open center steering gear without doing any work. To eliminate this energy loss, the valve timing in the gear would have to be modified. In addition, the timing of the metering valve and the steering gear valve would be extremely critical.

Further study of this prior system by applicant indicated that a better approach was to develop closed center valving for the steering gear. Incorporation of such a design change prohibits energy losses and potentially simplifies the system by eliminating the need for the metering valve, microprocessor and input sensors.

Those of significant skill in the vehicular art, including personnel of one of the "Big 3" manufacturers, were very skeptical of the operability of a closed center gear system concept, showing little interest. It is currently believed that such a system in one form or another had been attempted in the 1970s, with little or no success, and was abandoned.

DISCLOSURE OF INVENTION

The present invention relates to a power assisted steering system for motor vehicles. The basic, exemplary system includes an electric motor driven hydraulic pump, an accumulator, a pressure switch, and a steering gear. A unique feature of the system of the present invention is that it incorporates closed center valving in association with the steering gear.

Utilizing closed center valving in the steering gear allows the pump to build hydraulic pressure in the accumulator against the closed center valve for the gear. The pressure switch senses and maintains the pressure between specific limits, which in the invention are always relatively high. During steering maneuvers, the closed center valve meters the high pressure fluid flowing to the steering gear assist cylinder, providing the amount of assist needed to complete the maneuver. The closed center valve determines the flow (assist) by sensing steering wheel torque via a mechanical torsion link. The amount of assist can be tailored for different weight vehicles or different steering efforts in the same vehicle through various combinations of accumulator pressure, torsion sensing links and valve porting.

A primary advantage of this system over conventional systems with auxiliary belt drive pumps with open center valve steering gears is energy conservation. The system of the present invention uses energy on demand only. In contrast to the prior art, there are no losses through a belt drive, or from the pump continuously flowing oil or other hydraulic fluid through the open center valve gear, whether or not any assist is required.

Another advantage of the system of the present invention is packaging versatility. Since an accessory belt drive is not required, the system may be integrated into a single unit with the gear. In this configuration, only the connection of a power lead is required for operation. Optionally, the power unit (motor, pump, accumulator, etc.) may be remotely mounted to allow tighter packaging about the gear. In this configuration, hydraulic lines are required to connect the power unit to the gear.

The foregoing and other features and advantages of the present invention will become more apparent from the following further description and drawings.

BRIEF DESCRIPTION OF DRAWINGS

FIG. 2 is a cross-sectional view of the closed center valving element of the system of FIG. 1; while

Figure 2:
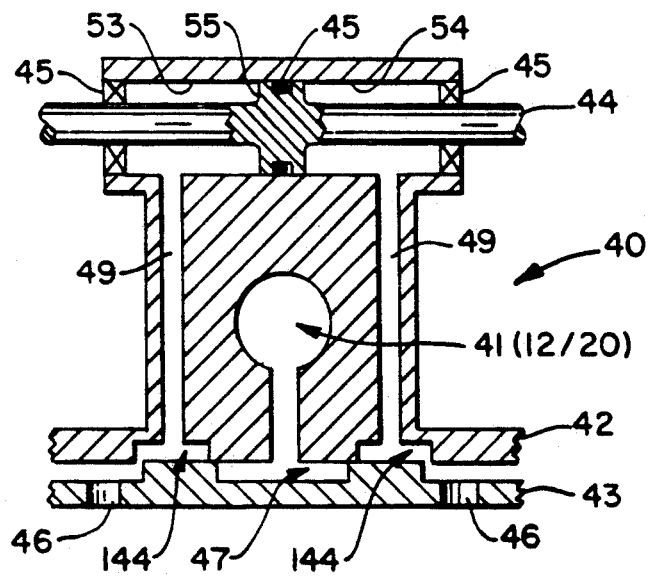
Figure 2A:
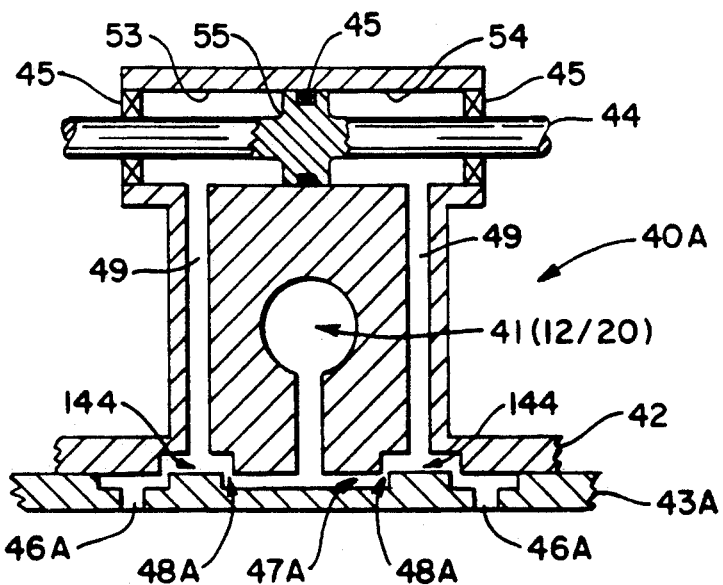
FIG. 2A is a view similar to that of FIG. 2 but showing the open center valving element used in the prior art systems.

It should be noted that FIGS. 2 & 2A represent schematic, cross-sectional representations generalized and simplified for purposes of more clearly bringing out the functional differences between the invention and the prior art.

Figure 3:
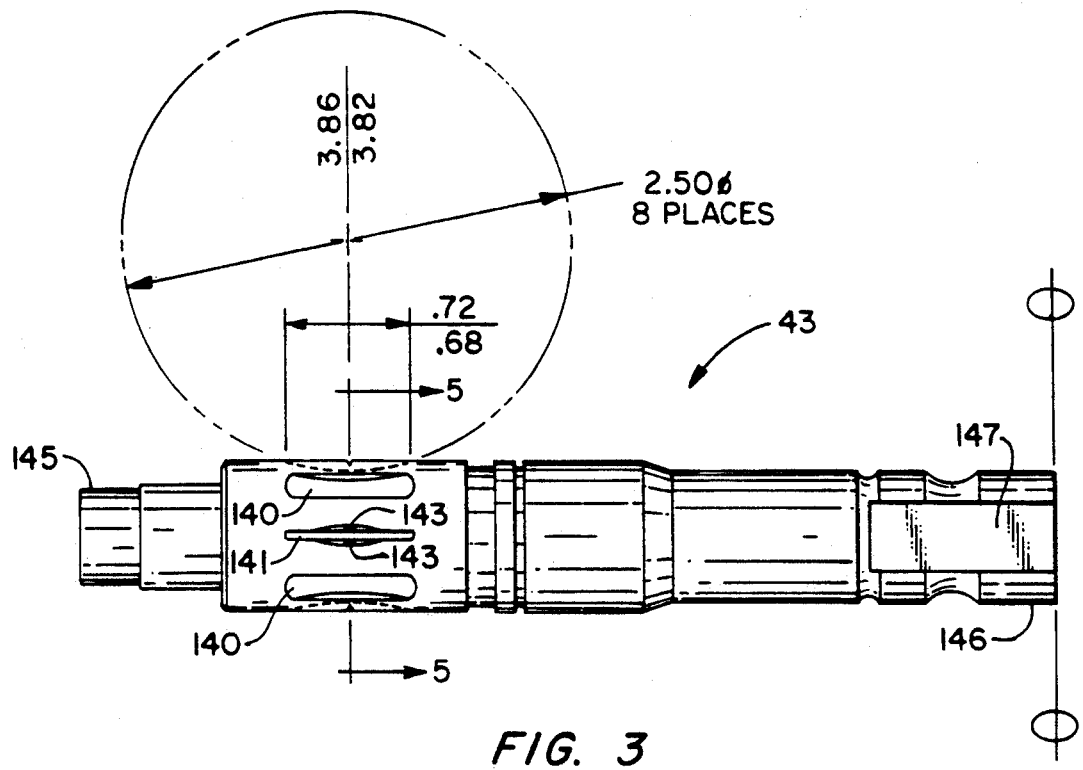

FIG. 3 is a side view of the input shaft element of the exemplary embodiment of the closed center valving used in the present invention.

Figure 4:
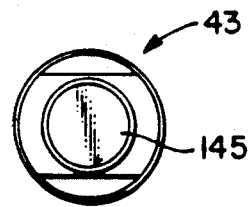

FIG. 4 is an end view of the input shaft element of FIG. 3, taken of the left end from the perspective of FIG. 3.

FIG. 5 is a cross-sectional view of the input shaft element of FIG. 3, taken along section lines 5—5 of FIG. 3, showing the longitudinally extended, external grooves for the alternating return ports and the pressure metering lands.

FIG. 6 is a partial, detail view of one of the pressure metering lands of FIG. 5, taken in the area of cut-lines 6—6 of FIG. 5.

FIG. 7 is a partial, detail view of the external groove for one of the return ports of FIG. 5, taken in the area of cut-lines 7—7 of FIG. 5.

FIG. 8 is a partial, detail view of a pressure dart used as part of the pressure metering land of FIG. 6, taken in the area of cut-lines 8—8 of FIG. 6.

BEST MODE FOR CARRYING OUT THE INVENTION

Figure 1:
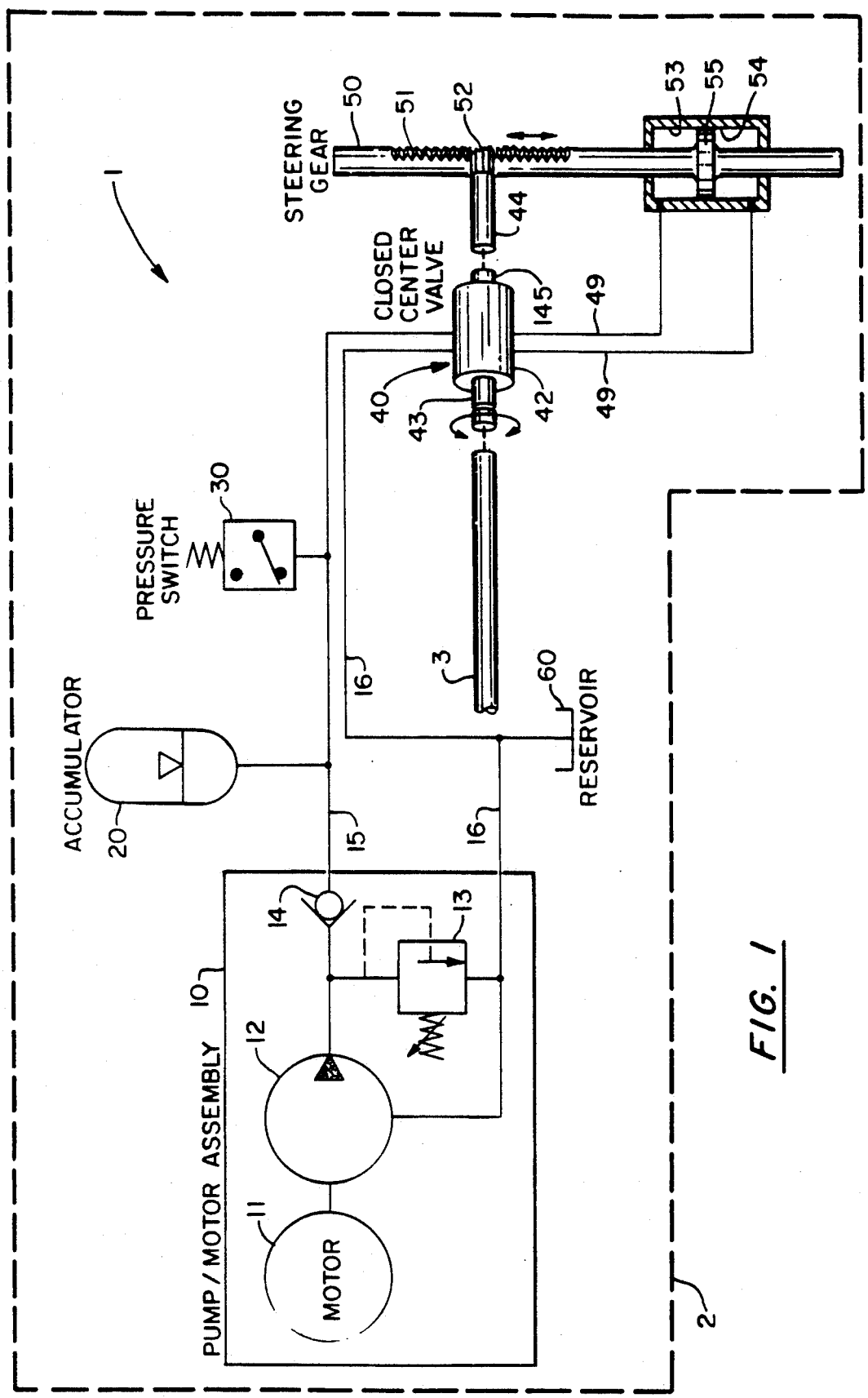
FIG. 1 is a schematic, function block diagram of the preferred embodiment of the over-all electro-hydraulic vehicular power steering system of the present invention using closed center valving for the steering gear, with standard hydraulic symbolism being used in the figure.

With reference to FIG. 1, the currently preferred, exemplary embodiment of the basic system 1 for the power assisted steering system for a motor vehicle 2 includes a pump motor assembly 10 with a hydraulic pump 12 driven by an electric motor 11. The pump 12 is hydraulic connected by line 15 to an accumulator 20 through a one-way check valve 14. An internal pressure relief 13 can be provided for the pump 12, if desired, as illustrated.

A pressure switch 30 is located in the hydraulic circuit between—and change "to" to—and the hydraulic accumulator 20 to the input side of the closed center valve 40, which in turn is mechanically and hydraulically connected to a steering gear 50. The pressure switch 30 is preset for selected pressure levels, which in the invention can be, for example, about eleven hundred to about sixteen hundred pounds per square inch (1,100 to 1,600 psi), a pressure of fifteen hundred being exemplary, which relatively pressure is constantly maintained when the valve 40 is centered. This is in contrast to the prior art, in which the pressure from the accumulator 20, regulated by the pressure switch 30 is built against an electronic metering valve (not shown) located in the hydraulic circuit prior to the open center valve 40A. This arrangement allows the pressure to vary, for example, from a relatively no pressure to about sixteen hundred pounds per square inch (50–1,600 psi) going from free flow, as explained more fully below, to its active steering change disposition.

Thus, a unique feature in the over-all combination of the system of the present invention is that it incorporates closed center valving 40 in association with the steering gear 50. Utilizing closed center valving 40 in association with the steering gear 50 allows the pump 12 to build hydraulic pressure in the accumulator 20 against the closed center valve 47 in the valving 40 for the steering gear 50, thus always maintaining a relatively high pressure, regardless of the position of the steering wheel and the input shaft 43. The pressure switch 30 senses and maintains the pressure between the specific limits set for a particular system.

The steering gear 50 can be of the rack-and-pinion type, as generally illustrated in FIG. 1, in which a conventional steering wheel shaft 3 via the input shaft 43 of the invention via a conventional torsion bar link (not illustrated) terminates in a pinion 52 meshing with a rack 51 attached to the front wheels (not illustrated) of the vehicle 2, steering the vehicle in the desired direction. The driver's power on the conventional steering wheel (not illustrated), causing the steering wheel shaft 3 and, with sufficient torque, input shaft 43 to rotate in the desired direction, is assisted by the power steering system through the hydraulic steering assist, right-left chambers 53-54 mounted on the rack element 51. As explained more fully below, the pressures in the chambers 53-54 in turn are controlled by the positioning of the closed center valve 40 and more particularly the relative positions of the input shaft 43 and the control sleeve 42.

During steering maneuvers, the closed center valve 40 meters the high pressure fluid flowing to the appropriate gear assist cylinder sections 53-54, providing the amount of assist needed to complete the maneuver. The closed center valve 40 determines the flow (assist) by sensing steering wheel torque via the mechanical torsion link (not illustrated) in a manner well known to the art. The amount of assist can be tailored for different weight vehicles or different steering efforts in the same vehicle through various combinations of accumulator pressure, torsion sensing links and valve porting.

With reference to FIG. 2, the pump/accumulator 12/20 provides hydraulic fluid under pressure via output line 15 to the central chamber 41 of the closed center valving 40. Because of the center positioning of the control sleeve 42, the pressure from the pump/accumulator 12/20 is trapped in the center area 47 and is not allowed to escape out the return ports 46 associated with the input shaft 43, thus allowing a relatively high pressure to be built up and maintained during the centering of the steering wheel shaft 3.

Such centering of the steering wheel shaft 3 occurs when the wheels are positioned in a set direction, whether dead ahead or in a turn, and the steering valve can be considered to be in its neutral disposition. When sufficient torque exists on the torsion bar link between the input shaft 43 and the pinion output shaft 44, due to the driver applying turning pressure on the steering wheel, causing the input shaft 43 to move with respect to the control sleeve 42, the system is considered out of center.

When the input shaft 43 is rotated in the desired direction, the pressure from the pump/accumulator 12/20 from chamber 41 is supplied to one side of the assist cylinder 53-54 against the piston 55, while the other side of the cylinder has the return passage to its respective return port 46 increased. The rack, assist cylinder shaft 44 and the piston 55 is sealed off by means of seals 45.

This trapping of the pressure in the center area 47 in the invention is in contrast to the prior art, open center configuration generally illustrated in FIG. 2A. In the latter, the center area 47A in the open center configuration, being significantly wider than the center area 47, is always in fluid communication through the side areas 48A with the return ports 46A, when the input shaft 43A is centered, allowing hydraulic fluid pressure to always flow, wasting energy. Otherwise, the various elements of the valving sections 40 & 40A can be the same, and like reference numbers are used for the analogous elements, but with the differing, analogous elements of FIG. 2A including an "A" with the analogous reference numbers of FIG. 2.

Thus, with respect to the prior art, open center valving 40A of FIG. 2A, when the valve is centered, pressure from the pump/accumulator 12/20 in chamber 41 free flows to the return ports 46A; and, when the input shaft 43A is rotated, the return passage 48A is closed to one side of the assist cylinder, while the pressure passage is increased. Simultaneously the other side of the cylinder has the pressure passage closed, and the return passage to its respective return port 46A increased. Changing the direction of steering wheel rotation produces the opposite, comparable actions. During the left and right, alternate turning of the steering wheel and hence the steering wheel shaft 3, the input shaft 43 will rotate, that is move in an arc back and forth with respect to the control sleeve 42 through a relatively small arc of movement.

It should be noted that FIGS. 2 & 2A represent schematic, cross-sectional representations, generalized and simplified for purposes of more clearly bringing out the functional and general structural differences between the invention and the prior art. Thus, in fact, the control sleeve 42 and the input shaft 43/43A form in general concentric, cylindrical, mating surfaces and are not linearly aligned as illustrated. Likewise, the hydraulic lines 49 leading to the hydraulic steering assist cylinder sections 53-54 (note also FIG. 1) are in fact opposite to that shown in FIGS. 2/2A.

With reference to FIGS. 3-8, an exemplary input shaft 43 is illustrated in detail, so that the differences between the input shaft of the prior art system and the invention can be made. As can be seen in FIG. 3, the exterior of the input shaft 43 includes a series of longitudinally extended grooves, one set 140 for the return ports 46 and an alternating set 141 for pressure metering lands 142 (note also FIG. 6). As can be seen in FIG. 8, the pressure metering lands include at their tops laterally extending darts 143 on both side of the grooves 141. The darts 143 allow minute metering of high pressure, since only little assist is needed at high speeds of vehicular movement, as compared for example to very low speeds of vehicular movement, as when parking.

The open center input shaft 43A (and in particular its grooving dimensions) of the prior art was redesigned in the invention to allow no flow when the modified, input shaft 43 of the invention was centered, as illustrated in FIG. 2. When rotated to either side, the grooves 140 mate with similar, longitudinally extended grooves 144, which they meet on the interior, inwardly facing side of the control sleeve 42.

The input shaft 43 at its end 145 is connected to the pinion output shaft 44 (note FIG. 1) through a torsion bar link in the conventional manner, while its other end 146 is connected to the steering wheel shaft 3 through a splined, clamped interconnection, all in the conventional manner. A flat surface 147 is provided for use in making up this steering wheel shaft interconnection. As is known, the torsion bar connection allows the input shaft 43 to move with respect to the control sleeve 42 when a sufficient torque is placed upon the link.

The return ports 46 are selectively hydraulically connected to the return line 16 to the reservoir 60 and ultimately back to the pump 12 in the conventional manner.

It is noted that the specific dimensional and angular details shown in FIGS. 3-8 are merely exemplary and subject to substantial variation.

Although the basic unit 1 is sufficient to provide power assisted steering, other components may be added to the system, if so desired, to achieve additional features. An example of such system variation would be to add a variable pressure regulating valve, which would allow drivers to adjust the steering feel (amount of assist) to their individual tastes.

Although this invention has been shown and described with respect to detailed, exemplary embodiment(s) thereof, it should be understood by those skilled in the art that various changes in form, detail, methodology and/or approach may be made without departing from the spirit and scope of this invention.

Having thus described at least one exemplary embodiment of the invention, that which is new and desired to be secured by Letters Patent is claimed below.

I claim:

1. In an electro-hydraulic vehicular power steering system for a motor vehicle having wheels, including— a hydraulic pump having a fluid output line and a fluid input line;

a hydraulic accumulator connected to the output line of said pump;

a steering wheel shaft and a steering gear for turning the wheels of the vehicle, said shaft having centered positions in which the vehicle wheels are not being turned from a selected position;

a steering assist cylinder having a left chamber section and a right chamber section associated with said steering gear, assisting the driver of the vehicle in causing the steering gear to be moved, to move the wheels to the left or right and back again;

a reservoir connected to the fluid input line of said pump; and hydraulic valving connected between said accumulator and said reservoir and hydraulically associated with said assist cylinder controlling the amount of driving fluid fed to said assist cylinder in response to the driver's turning the steering wheel; said valving including a control sleeve and an input shaft rotatably positioned within and movable concentrically with said control sleeve in response to the driver's turning the steering wheel, said control sleeve and said input shaft having peripherally spaced, longitudinally extended, interfacing grooves which when mated allow hydraulic fluid to flow from said accumulator to said assist cylinder and from said valving to said reservoir;

the improvement comprising:

said mating grooves being out of interfacing, hydraulic communication with each other when said steering wheel shaft is centered, providing closed center valving, allowing the pressure to be built up in the accumulator to a relatively high value when said steering shaft is centered.

2. A method of providing electro-hydraulic vehicular power steering for a motor vehicle having wheels, which vehicle includes— a hydraulic pump having a fluid output line and a fluid input line;

a hydraulic accumulator connected to the output line of said pump;

a steering wheel shaft and a steering gear for turning the wheels of the vehicle, said shaft having centered positions in which the vehicle wheels are not being turned from a selected position;

a steering assist cylinder having a left chamber section and a right chamber section associated with said steering gear, assisting the driver of the vehicle in causing the steering gear to be moved, to move the wheels to the left or right and back again;

a reservoir connected to the fluid input line of said pump; and hydraulic valving connected between said accumulator and said reservoir and hydraulically associated with said assist cylinder controlling the amount of driving fluid fed to said assist cylinder in response to the driver's turning the steering wheel; said valving including a control sleeve and an input shaft rotatably positioned within and movable concentrically with said control sleeve in response to the driver's turning the steering wheel, said control sleeve and said input shaft having peripherally spaced, longitudinally extended, interfacing grooves which when mated allow hydraulic fluid to flow from said accumulator to said assist cylinder and from said valving to said reservoir;

said method comprising the following steps:

providing said input shaft and said control sleeve so that said mating grooves are out of interfacing, hydraulic communication with each other when said steering wheel shaft is centered, providing closed center valving, allowing the pressure to be built up in the accumulator to a relatively high value when said steering shaft is centered.

* * * * *

UNITED STATES PATENT AND TRADEMARK OFFICE
CERTIFICATE OF CORRECTION

PATENT NO. : 5,209,317

DATED : May 11, 1993

INVENTOR(S) : Steven H. Schnelle

It is certified that error appears in the above-identified patent and that said Letters Patent is hereby corrected as shown below:

Column 3, line 28, delete "and change "to" to --and"

Column 3, line 29, change "to" to -- and --

Column 3, line 43, delete "a relatively"

Column 3, line 44, change "50" to -- 0 --

Signed and Sealed this

Fifth Day of April, 1994

Attest:

BRUCE LEHMAN

Attesting Officer

Commissioner of Patents and Trademarks